(12) United States Patent
Batkilin et al.

(10) Patent No.: US 9,360,571 B2
(45) Date of Patent: Jun. 7, 2016

(54) SYSTEM AND METHOD FOR CORRECTION OF VIGNETTING EFFECT IN MULTI-CAMERA FLAT PANEL X-RAY DETECTORS

(75) Inventors: Eduard Batkilin, Nesher (IL); Irina Karelin, Haifa (IL); Alex Feldman, Nofit (IL)

(73) Assignee: GENERIC IMAGING LTD., Nesher (IL)

( * ) Notice: Subject to any disclaimer, the term of this patent is extended or adjusted under 35 U.S.C. 154(b) by 217 days.

(21) Appl. No.: 14/113,590

(22) PCT Filed: Apr. 24, 2012

(86) PCT No.: PCT/IL2012/050147
§ 371 (c)(1),
(2), (4) Date: Oct. 24, 2013

(87) PCT Pub. No.: WO2012/147083
PCT Pub. Date: Nov. 1, 2012

(65) Prior Publication Data
US 2014/0042310 A1  Feb. 13, 2014

Related U.S. Application Data

(60) Provisional application No. 61/517,668, filed on Apr. 25, 2011.

(51) Int. Cl.
*G01T 7/00* (2006.01)
*G01T 1/20* (2006.01)

(52) U.S. Cl.
CPC .............. *G01T 7/005* (2013.01); *G01T 1/2018* (2013.01)

(58) Field of Classification Search
CPC ............................ G01T 1/2018; G01T 7/005
USPC ............. 250/370.09, 370.11, 252.1; 382/254, 382/274, 275
See application file for complete search history.

(56) References Cited

U.S. PATENT DOCUMENTS 4,143,271 A * 3/1979 Klein et al. .................... 250/368
4,424,446 A * 1/1984 Inbar et al. ............... 250/363.07
(Continued)

FOREIGN PATENT DOCUMENTS

IL           52873        10/1987

OTHER PUBLICATIONS

Zheng et al., "Single-Image Vignetting Correction", 2009, IEEE Transactions on Pattern Analysis and Machine Intelligence 31(12), pp. 2243-2256.*

(Continued)

*Primary Examiner* — David Porta
*Assistant Examiner* — Blake Riddick
(74) *Attorney, Agent, or Firm* — Pearl Cohen Zedek Latzer Baratz LLP

(57) ABSTRACT

A system and method for correcting vignetting distortion in an imaging sensor of a multi-camera flat panel X-Ray detector. A scintillator converts X-Ray radiation generated by an X-Ray source into detectable radiation. A displacement unit generates, during a calibration phase, relative displacement between the X-Ray detector and an X-Ray source at a plane parallel to the scintillator. The imaging sensor acquires, during the calibration phase, a first and a second partial images, the first partial image is acquired before the relative displacement is generated, and the second partial image is acquired after the relative displacement is generated. A relative displacement measurement unit measures the relative displacement. Coefficients of a preliminary inverse vignetting function are calculated based on differences between corresponding pixels of the two partial images.

14 Claims, 4 Drawing Sheets

(56) References Cited

U.S. PATENT DOCUMENTS

| | | | | |
|---|---|---|---|---|
| 4,687,917 | A * | 8/1987 | Kusaka | G02B 7/346 250/201.8 |
| 4,764,944 | A * | 8/1988 | Finlayson | 378/20 |
| 5,191,201 | A * | 3/1993 | Kusaka et al. | 250/201.8 |
| 5,434,902 | A * | 7/1995 | Bruijns | 378/98.7 |
| 5,602,896 | A * | 2/1997 | Diepstraten | 378/98.7 |
| 5,881,163 | A * | 3/1999 | Slump et al. | 382/132 |
| 6,081,577 | A * | 6/2000 | Webber | 378/23 |
| 6,125,335 | A * | 9/2000 | Simon et al. | 702/85 |
| 6,249,616 | B1 * | 6/2001 | Hashimoto | G06T 7/0034 345/427 |
| 6,392,235 | B1 * | 5/2002 | Barrett et al. | 250/363.06 |
| 6,476,394 | B1 * | 11/2002 | Amitani et al. | 250/368 |
| 6,928,142 | B2 * | 8/2005 | Shao et al. | 378/63 |
| 2002/0039139 | A1 * | 4/2002 | Hsu et al. | 348/222 |
| 2003/0043962 | A1 * | 3/2003 | Lai | 378/23 |
| 2003/0052987 | A1 * | 3/2003 | Li et al. | 348/335 |
| 2003/0160622 | A1 * | 8/2003 | Duensing et al. | 324/691 |
| 2003/0212320 | A1 * | 11/2003 | Wilk | A61B 6/032 600/407 |
| 2004/0022363 | A1 * | 2/2004 | Ghelmansarai | 378/206 |
| 2004/0155970 | A1 * | 8/2004 | Johannesson et al. | 348/231.6 |
| 2005/0025347 | A1 * | 2/2005 | Makram-Ebeid et al. | 382/128 |
| 2005/0192495 | A1 * | 9/2005 | Makram-Ebeid et al. | 600/407 |
| 2006/0204128 | A1 * | 9/2006 | Silverstein | 382/275 |
| 2008/0219541 | A1 * | 9/2008 | Hopkins et al. | 382/132 |
| 2009/0050811 | A1 * | 2/2009 | Barrett et al. | 250/363.04 |
| 2009/0290034 | A1 * | 11/2009 | Ludwig | H04N 5/225 348/218.1 |
| 2010/0140487 | A1 | 6/2010 | Barrett et al. | |
| 2011/0066884 | A1 | 3/2011 | Suzuki et al. | |
| 2011/0116694 | A1 * | 5/2011 | Gareau | 382/128 |
| 2011/0198503 | A1 * | 8/2011 | Koren et al. | 250/362 |

OTHER PUBLICATIONS

International Search Report of Application No. PCT/IL2012/050147 mailed on Sep. 11, 2012.
Richard Szeliski. Computer Vision: Algorithms and Applications. Springer, New York, 2010, pp. 25, 30.
Mitsunaga, T., Nayar, S.: Radiometric Self Calibration. In: IEEE Conference on Computer Vision and Pattern Recognition (CVPR). vol. 1. (Jun. 1999) 374-380.
European Supplementary Search Report for Application No. 12777651.6, mailed on Oct. 10, 2014.
Mitsunaga et al. "Radiometric Self Calibration" Computer Vision and Pattern Recognition, 1999. IEEE Computer Society Conference on Jun. 23-25, 1999.
Tsin et al. "Statistical calibration of CCD imaging process" Computer Vision, 2001. ICCV 2001. Proceedings Eighth IEEE International Conference on (vol. 1 ), Jul. 7, 2001.

* cited by examiner

SYSTEM AND METHOD FOR CORRECTION OF VIGNETTING EFFECT IN MULTI-CAMERA FLAT PANEL X-RAY DETECTORS

CROSS-REFERENCE TO RELATED APPLICATIONS

This application is a National Phase Application of PCT International Patent Application No. PCT/IL2012/050147, entitled "SYSTEM AND METHOD FOR CORRECTION OF VIGNETTING EFFECT IN MULTI-CAMERA FLAT PANEL X-RAY DETECTORS", International Filing Date Apr. 24, 2012, published on Nov. 1, 2012, as International Patent Application Publication No. WO 2012/147083, which in turn claims priority from U.S. Provisional Patent Application No. 61/517,668, filed Apr. 25, 2011, both of which are incorporated herein by reference in their entirety.

BACKGROUND OF THE INVENTION

Flat panel X-Ray detectors are in wide use in medicine. Most of these flat panel X-Ray detectors are based on a single light detector chip coupled with a scintillator. However, detectors of such a design are typically expensive. The single detector chip may be replaced by a plurality of less expensive optical sensors (e.g. CCD or CMOS) and lenses, which are arranged into a flat multi-camera array. X-Ray detectors including the multi-camera array may be less expensive in comparison with the single chip detectors since simpler sensors and lenses may be used. In multi-camera X-Ray detectors, each optical sensor acquires optical light irradiation from a segment of the scene as radiated from the scintillator. A complete image may be composed by stitching the plurality of partial images acquired by the plurality of single sensors.

The output image quality may be measured and assessed visually by visibility of the seam between the stitched partial images. Unfortunately, two neighbor images typically have intensity discrepancies in overlapping regions caused by differences in the relevant features of the sensors and their lenses, such as sensor's linearity of light-to-electrical transfer response, unity of optical performance of the lens, dark current, etc.

In addition, the acquired images may be distorted due to vignetting. A common effect of wide-angle and wide-aperture lenses is that the image tends to darken at the edges. This problem is generally referred as vignetting. Different variances of vignetting may include natural, optical, and mechanical vignetting. Vignetting is a result of undesired properties of the optical system due to light energy influx changes along the field of view (FOV) of the camera, caused by the optical system.

Stitching of images that were distorted by the vignetting effect may result in visible stitches in the complete image. Such an image may be visually unpleasant. Even worse, such a distorted image may make it difficult for a physician to visualize the true physiology of the patient and may lead to wrong diagnosis in some cases.

It would, therefore, be desirable to minimize and even completely eliminate the vignetting effect and produce a substantially seamless image.

SUMMARY OF THE INVENTION

According to embodiments of the present invention there is provided a method for correcting vignetting distortion in an imaging sensor of a multi-camera flat panel X-Ray detector, the method may include taking a first partial X-Ray image by the imaging sensor; creating relative displacement between the X-Ray detector and an X-Ray source at a plane parallel to a plane of a scintillator of the detector; taking a second partial X-Ray image by the imaging sensor; obtaining the relative displacement between the first partial X-Ray image and the second partial X-Ray image; and calculating coefficients of a preliminary inverse vignetting function based on differences between corresponding pixels of the two partial images.

Furthermore, according to embodiments of the present invention the method may include calculating a gain for the imaging sensor by equalizing values of pixels captured by the imaging sensor as well as by at least one other imaging sensor of the multi-camera flat panel X-Ray detector; and adjusting the coefficients of the preliminary inverse vignetting function by the gain of the optical module to obtain coefficients of a final inverse vignetting function.

Furthermore, according to embodiments of the present invention the method may include, during routine operation of the detector, acquiring routine partial X-Ray images; and adjusting the routine partial X-Ray images, using the final inverse vignetting function to obtain adjusted partial X-Ray images.

Furthermore, according to embodiments of the present invention the method may include compensating for non-uniformity of noise contribution in the adjusted partial X-Ray images using simulated noise calculated based on measured noise parameters of the imaging sensor.

Furthermore, according to embodiments of the present invention the initial and final inverse vignetting functions may be polynomial functions.

Furthermore, according to embodiments of the present invention the relative displacement between the first partial X-Ray image and the second partial X-Ray image may be obtained based on the differences between coordinates of a marker visible on the first partial X-Ray image and the second partial X-Ray image, wherein the marker remains in a constant location relatively to X-Ray source when the relative displacement is generated.

Furthermore, according to embodiments of the present invention the relative displacement between the first partial X-Ray image and the second partial X-Ray image is obtained based on the differences between coordinates of a first marker and a second marker visible on the second partial X-Ray image, wherein the first marker and the second marker are aligned with respect to an axis perpendicular to the scintillator of the detector before the relative displacement is generated, and wherein the first marker remains in a constant location relatively to X-Ray source, and the second marker remains in a constant location relatively to the detector, when the relative displacement is generated.

According to embodiments of the present invention there is provided a multi-camera flat panel X-Ray detector, the detector may include a scintillator to convert X-Ray radiation generated by an X-Ray source into detectable radiation; a displacement unit to generate, during a calibration phase, relative displacement between the X-Ray detector and an X-Ray source at a plane parallel to the scintillator; at least one imaging sensor to acquire, during the calibration phase, a first and a second partial images related to the detectable radiation, at a field of view of the at least one imaging sensor, wherein the first partial image is to be acquired before the relative displacement is generated, and the second partial image is to be acquired after the relative displacement is generated; a relative displacement measurement unit to measure the relative displacement; and a processing unit to: obtain the relative displacement, the first and the second partial images; and to calculate coefficients of a preliminary inverse vignetting function based on differences between corresponding pixels of the two partial images.

Furthermore, according to embodiments of the present invention the processing unit may calculate a gain for the imaging sensor by equalizing values of pixels captured by the imaging sensor as well as by at least one other imaging sensor of the multi-camera flat panel X-Ray detector; and adjust the coefficients of the preliminary inverse vignetting function by the gain of the optical module to obtain coefficients of a final inverse vignetting function.

Furthermore, according to embodiments of the present invention the method may include Furthermore, according to embodiments of the present invention, during routine operation of the detector, the at least one imaging sensor may acquire routine partial X-Ray images; and the processing unit may adjust the routine partial X-Ray images, using the final inverse vignetting function to obtain adjusted partial X-Ray images.

Furthermore, according to embodiments of the present invention, during routine operation of the detector, the processing unit may compensate for non-uniformity of noise contribution in the adjusted partial X-Ray images using simulated noise calculated based on measured noise parameters of the imaging sensor.

Furthermore, according to embodiments of the present invention the initial and final inverse vignetting functions are polynomial functions.

Furthermore, according to embodiments of the present invention the relative displacement measurement unit may include a marker visible on the first partial X-Ray image and the second partial X-Ray image, wherein the marker remains in a constant location relatively to X-Ray source when the relative displacement is generated, and wherein relative displacement between the first partial X-Ray image and the second partial X-Ray image may be measured based on the differences between coordinates of the marker on the first partial X-Ray image and the second partial X-Ray image.

Furthermore, according to embodiments of the present invention the relative displacement measurement unit may include a first marker and a second marker visible on the second partial X-Ray image, wherein the first marker and the second marker are aligned with respect to an axis perpendicular to the scintillator before the relative displacement is generated, and wherein the first marker remains in a constant location relatively to X-Ray source, and the second marker remains in a constant location relatively to the detector, when the relative displacement is generated, and wherein the relative displacement between the first partial X-Ray image and the second partial X-Ray image may be obtained based on the differences between coordinates of the first marker and the second marker on the second partial X-Ray image.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
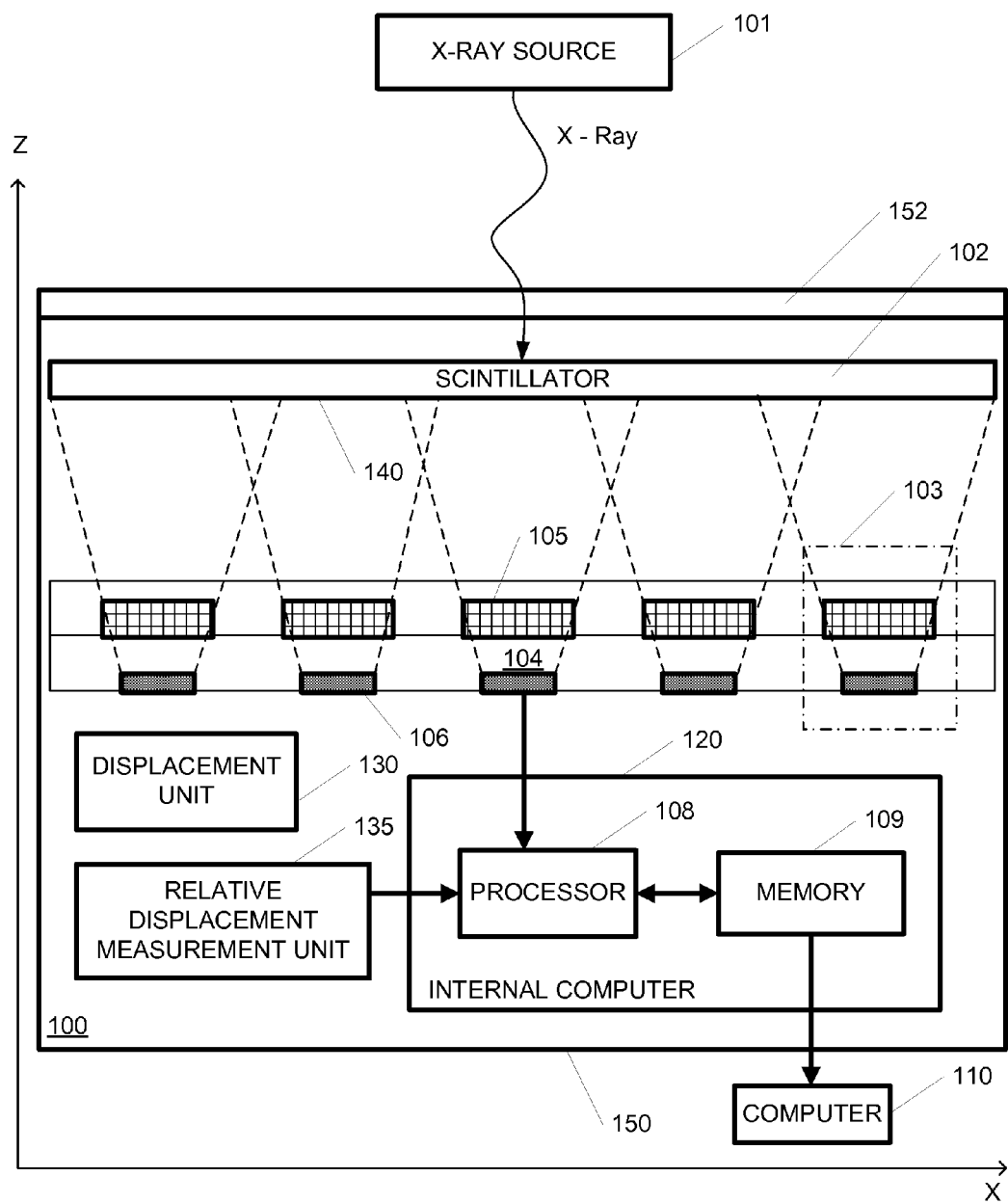
FIG. 1 is a high-level illustration of an exemplary multi-camera flat panel X-Ray detector according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS
OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Reference is made to FIG. 1 depicting a high-level illustration of an exemplary multi-camera flat panel X-Ray detector 100 according to embodiments of the present invention. According to embodiments of the present invention, detector 100 may include a scintillator layer 102, multi-camera array 104 and an internal computer 120. Detector 100 may be placed inside casing 150 having X-Ray transparent or translucent cover 152. Cover 152 may face X-Ray source 152 and may be removable or not removable. Detector 100 may further include a displacement unit 130 and relative displacement measurement unit 135. It should be noted, however, that while drawn as separate blocks within casing 150 of detector 100, displacement unit 130 and relative displacement measurement unit 135 may be physically located outside, or partially outside casing 150. Similarly, calculations related to displacement unit 130 and relative displacement measurement unit 135 may be performed by a processing unit, e.g. internal computer 120 or external computer 110.

For simplicity of the presentation, a right hand Cartesian coordinates system is defined. The X-Y plane of the coordinates system is parallel scintillator 102 of detector 100 and perpendicular to the plane of the page of FIG. 1., and the Z axis is defined perpendicular to the X-Y plane, as in right hand Cartesian coordinates system.

Scintillator layer 102 may be placed inside casing 150, substantially parallel to cover 152 and may convert X-Ray energy transmitted from X-Ray source 101 into a second radiation, typically at a lower energy, which is detectable by imaging sensors 106. For example, Scintillator layer 102 may convert X-Ray energy transmitted from X-Ray source 101 into visible light. Scintillator layer 102 may be made of any scintillating material suitable for converting X-Ray radiation into the second radiation, for example, into visible light, such as Cesium Iodide (CsI) and GOS ($Gd_2O_2S$: Tb). Throughout the description of embodiments of the present application, the second radiation will be referred to as detectable radiation.

Multi-camera array 104 may include a plurality of imaging sensors 106 and lenses 105. Lenses 105 may be arranged to focus light onto imaging sensors 106. Imaging sensors 106 may be any component capable of producing a digital signal indicative of the detectable radiation impinging on the respective imaging sensor. For example, if detectable radiation is in the range of visible light, imaging sensors 106 may include charge coupled devices (CCDs) or optical complementary metal-oxide-semiconductor (CMOS) sensors, or any other suitable optical sensor, used, for example, for off the shelf digital cameras. Sensors 106 may be arranged in array 104 in any desired configuration, such as linear 2D array, etc. According to a typical configuration, multi-camera array 104 may include a plurality of optical modules 103, each including an arrangement of at least one lens 105 and at least one imaging sensor 106. For example, optical modules 103 may include pairs of one optical sensor 106 and one lens 105. However, other configuration may exist. Embodiments of the present invention are not confined to a specific lens and optical sensors arrangement.

Displacement unit 130 may include any mechanism capable of creating a relative shift between detector 100 and X-Ray source 101 parallel to the X-Y plane, such that scintillator 102 of detector 100 remains substantially perpendicular to the direction of the radiation from X-Ray source 101. Considering the X and Y projections of the vector of movement, the relative shift may be about 3-6% of the X and Y dimensions, respectively, of a field of view (FOV) of a single imaging sensor 106 on scintillator 102. For example, for imaging sensors having a FOV of 50 by 70 millimeters on scintillator 102, displacement of 1.5-3 mm aligned with the dimension of 50 mm and displacement of 2.1-4.2 mm aligned with the dimension of 70 mm may constitute a relative displacement of 3-6%. Accordingly, displacement unit 130 may include a mechanism capable of creating a relative shift of 2-4 millimeters of detector 100 relative to X-Ray source 101 parallel to the X-Y plane.

For example, displacement unit 130 may include any mechanism capable of moving detector 100 relatively to X-Ray source 101 parallel to the X-Y plane. Alternatively, displacement unit 130 may include any mechanism capable of moving X-Ray source 101 relatively to detector 100 parallel to the X-Y plane. For example, displacement unit 130 may include a rigid surface (not shown) on which detector 100 can slide. Detector 100 may be moved manually by an operator or by motors (not shown).

Relative displacement measurement unit 135 may be capable of measuring the relative displacement caused by displacement unit 130. For achieving substantially seamless images, relative displacement measurement unit 135 should be capable of measuring the relative displacement with accuracy corresponding to $\frac{1}{10}$ of a FOV of a single pixel of an imaging sensor 106 on scintillator 102. For example, relative displacement measurement unit 135 may include X-Ray translucent or opaque markers (e.g. marker 115 in FIGS. 3 and 4).

Detector 100 may include an internal computer 120 including a processor 108, adapted to receive signals from imaging sensors 106, and memory unit 109. Detector 100 may be further connected to an external computer 110. For example, external computer 110 may be connected to internal computer 120. External computer 110 may include components such as, but not limited to, a plurality of central processing units (CPU) or any other suitable multi-purpose or specific processors or controllers, a plurality of input units, a plurality of output units, a plurality of memory units, and a plurality of storage units, and may receive commands and present output to an operator of detector 100. External computer 110 may be connected (not shown) also to X-Ray source 101.

Detector 100, external computer 110, or X-Ray source 101, or a third entity (not shown) may initiate imaging by triggering imaging sensors 106 substantially simultaneously with X-Ray s from X-Ray source 101. In response to the triggering signal, X-Ray radiation may be emitted by X-Ray source 101. The emitted radiation may pass through or be partially absorbed by a specimen (not shown), if present between X-Ray source 101 and detector 100, and through cover 152, and be absorbed by scintillator 102. Scintillator 102 may convert the absorbed X-Ray radiation into detectable radiation. The detectable radiation may pass through lenses 105 and be focused on and detected by imaging sensors 106 of camera array 104. Each imaging sensor 106 may produce a partial image, indicative of the detectable radiation radiated by a respective segment 140 of scintillator 102 that is within the FOV of imaging sensor 106. The plurality of partial images produced by camera array 104, may be stored for further processing by internal computer 120 in memory unit 109.

The FOV of each imaging sensor 106 may include a respective segment 140 of scintillator 102. Each section of scintillator 102 that is within the FOV of camera array 104 may be represented in at least one partial image. Therefore a complete image of the FOV of camera array 104 may be composed, for example, by a processing unit such as internal computer 120 or external computer 110, from the stored partial images by stitching the partial images using various stitching techniques as known in the art. The resulting image is the complete X-Ray image.

For simplicity of the explanation, sources of image distortions, such as geometric distortion, as well as other sources of error such as dark current, etc. are disregarded. However it should be readily understood by those skilled in the art that methods for correction of vignetting according to embodiments of the present invention may be used together with other image enhancement techniques. For example, correction of vignetting effect may be used in addition to removal of dark current noise, for example, using dark frame subtraction, and/or methods used to correct geometrical distortion, or for linearization of camera response function, etc. For example, it may be assumed that other sources of error are being corrected concurrently, before or after the correction of vignetting effect according to embodiments of the present invention.

It is assumed for simplicity and clarity of the mathematical representation, that the matrix of each of imaging sensors 106, as well as the partial images generated by each imaging sensors 106 are rectangular, and that each pixel on imaging sensors 106 is rectangular. The matrix of each of imaging sensors 106 has a size of M×N pixels. It is also assumed that the corresponding segments 140 on the surface of scintillator 102 are rectangular as well. These assumptions are non binding and do not limit embodiments of the present invention.

Segments 140 of scintillator 102 may have the same aspect ratio as the rectangle of imaging sensors 106. As used herein, scintillator pixels may refer to small scintillator rectangles that are within the FOV of the respective pixels of the respective imaging sensors 106. Scintillator pixel matrix of a segment 140 may, therefore, have the dimension of M×N, same as the matrix of imaging sensors 106.

A pixel on a matrix of an imaging sensor 106 has coordinates $(x_s, y_s)$ relatively a reference point on the partial image, for example, to a left upper corner of the partial image. Pixel $(x_s, y_s)$ corresponds to a scintillator pixel with coordinates $(x, y)$ relatively to a reference point on scintillator segment 140 corresponding to the reference point on the partial image, for example, to the left upper corner of scintillator segment 140.

Let $L(x, y)$ denote light energy quantity emitted by scintillator pixel with coordinates $(x, y)$. Disregarding vignetting, light energy impinging pixel $(x_s, y_s)$ of an imaging sensor 106 is:

$$L_S(x_S, y_S) = a \cdot L(x, y), \quad \text{(Equation 1)}$$

Where $0 < a < 1$ is a constant related to light loss in lenses 105. A vignetting effect of lens 105 may be represented by a vignetting factor $V_S(x_S, y_S)$. Vignetting effect may change the quantity of light impinging on pixel $(x_s, y_s)$ at the sensor s and therefore resulting light energy quantity may become:

$$L_{VS}(x_S, y_S) = V_S(x_S, y_S) \cdot L_S(x_S, y_S), \quad \text{(Equation 2)}$$

Where $0 < V_S(x_S, y_S) < 1$ is a vignetting factor depending on properties of lens 105 and location of the pixel relatively to lens 105.

Disregarding non linearity of imaging sensors 106, the photometric response for a given imaging sensor 106 is a linear function satisfying:

$$E_{vs}(x_s, y_s) = b \cdot L_{vs}(x_s, y_s) + n(x_s, y_s), \quad \text{(Equation 3)}$$

Where b is a gain of a given imaging sensor 106, $n(x_S, y_S)$ is random camera noise, pixel value $E_{VS}(x_S, y_S)$ is an output signal from pixel $(x_s, y_s)$, representing the level of light energy at scintillator pixel with coordinates $(x, y)$. The output signal may be, for example, a gray level value of the pixel in the partial image generated by imaging sensor 106. For example, it may be assumed that linearization of the photometric response of imaging sensor 106 was performed prior to elimination vignetting. It should be noted that random camera noise $n(x_S, y_S)$ is an attribute of imaging sensor 106. Random camera noise $n(x_S, y_S)$ may be substantially uniform across imaging sensor 106, and is not affected by vignetting.

Let $E_S(x_S, y_S)$ denote a corrected output signal, in which the vignetting effect is corrected:

$$E_S(x_S, y_S) = v_S(x_S, y_S) \cdot E_{VS}(x_S, y_S), \quad \text{(Equation 4)}$$

Where $$v_s(x_s, y_s) = \frac{1}{V_s}(x_s, y_s)$$

is an inverse vignetting function. Substituting equations 1, 2 and 3 into equation 4 yields:

$$E_S(x_S, y_S) = b \cdot a \cdot L(x, y) + n(x_S, y_S) \cdot v_S(x_S, y_S), \quad \text{(Equation 5)}$$

Where $G = b \cdot a$ is a gain of an optical module 103. G may substantially differ among optical modules 103.

Some scintillator pixels may be captured, each, by two or more imaging sensors in multi-camera array 104 because of overlapping of viewing areas of optical modules 103. However these pixels may have different gray level values in different partial images taken by different imaging sensors 106 as a result of vignetting and gain differences.

Figure 2:
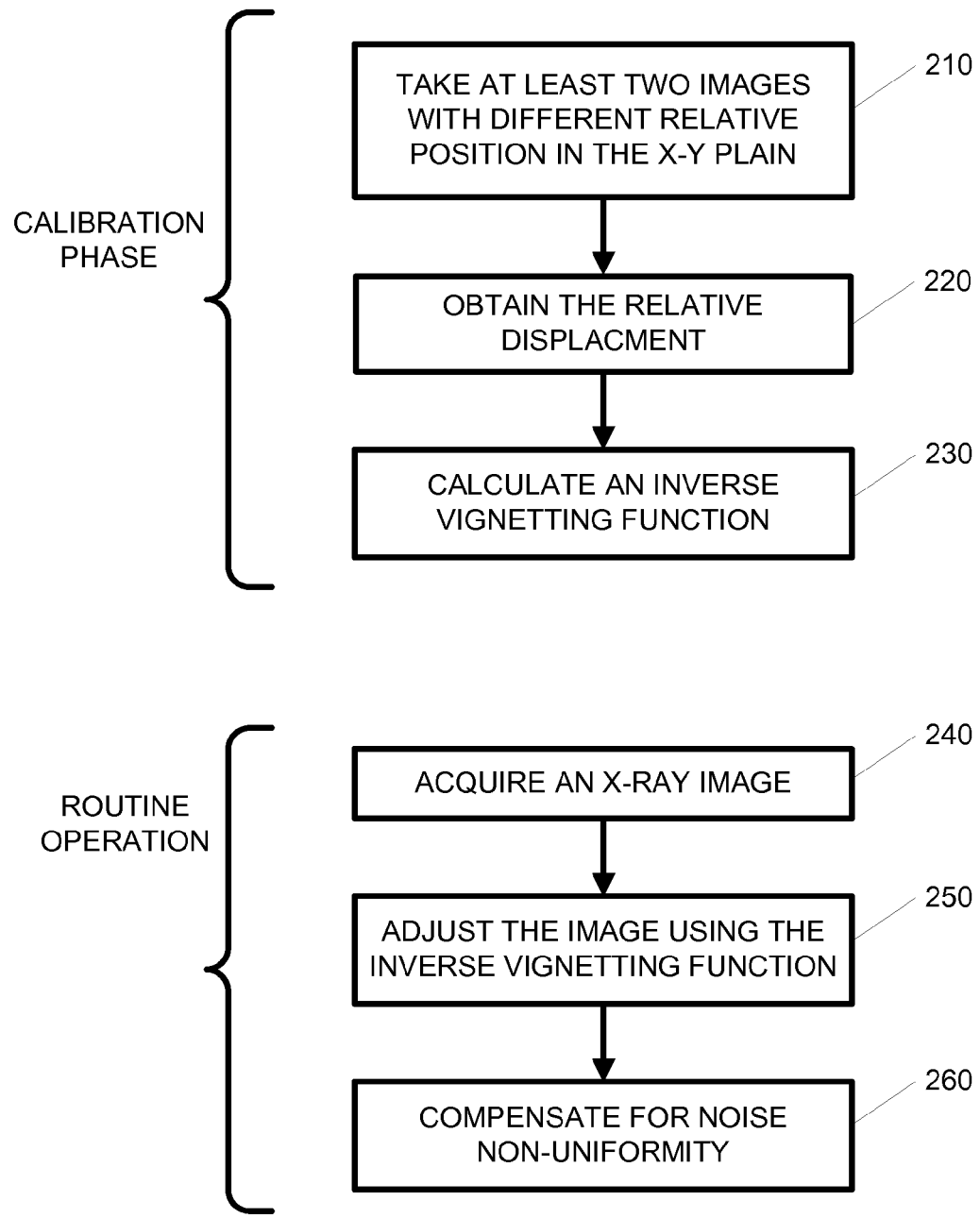
FIG. 2 is a flowchart illustration of a method for correction of vignetting effect in a multi-camera flat panel X-Ray detector according to embodiments of the present invention.

Reference is now made to FIG. 2 which is a flowchart illustration of a method for correction of vignetting effect for a multi-camera flat panel X-Ray detector according to embodiments of the present invention. According to embodiments of the present invention, an inverse vignetting function, denoted $v_S$, may be calculated for each imaging sensor 106 during a calibration phase and used for adjusting partial X-Ray images during routine operation. The method may be performed by displacement unit 130, relative displacement measurement unit 135, and a processing unit such as internal computer 120 or external computer 110.

During the calibration phase, at least two sets of partial images with different relative position of detector 100 with relation to X-Ray source 101 parallel to the X-Y plane may be acquired 210 by imaging sensors 106. A first set of partial images may be acquired before relative displacement between detector 100 and X-Ray source 101 is generated and a second set of partial images may be acquired after relative displacement between detector 100 and X-Ray source 101 is generated. Other imaging parameters, including the relative distance between detector 100 with relation to X-Ray source 101 along the Z-axis, as well as the intensity of the radiation and the exposure conditions of X-Ray source 101 should remain substantially constant while capturing the two sets. The partial images may relate to detectable radiation present at a field of view of the imaging sensor 106, the detectable radiation corresponding to X-Ray radiation generated by X-Ray source 101. For example, a scintillator 102 may be used to convert X-Ray radiation generated by X-Ray source 101 to detectable radiation.

The relative displacement between the two sets of partial images may be obtained 220. For example, the relative displacement may be calculated based on the location of markers visible on the sets of images.

An inverse vignetting function $v_S$ of a given imaging sensor 106 may be calculated or approximated 230 based on the two partial images acquired by that imaging sensor 106 and on the relative displacement generated between detector 100 and X-Ray source 101 is generated. The inverse vignetting function $v_S$ may be calculated or approximated, inter alia, based on differences between corresponding pixel values of the two partial images acquired by the same imaging sensor 106. A non binding example of such approximation method is presented hereinbelow. It should be readily understood to these skilled in the art that other techniques may be used to calculate or approximate inverse vignetting function $v_S$ based on the two sets of images. Embodiments of the present invention are not limited to the specific example presented. For example, it may be assumed that an inverse vignetting function $v_S(x_S, y_S)$ may be represented by any smooth function e.g., trigonometric functions etc.

According to embodiments of the present invention, it may be assumed that inverse vignetting function $v_S(x_S, y_S)$ has a polynomial representation:

$$v_s(x_s, y_s) = \sum_{n,m=0}^{p} c_{mn} \cdot x_s^n \cdot y_s^m, \qquad \text{(Equation 2)}$$

where p is the degree of the polynomial and coefficients $c_{mn}$ are real numbers.

Let $E_{VS}^1$ denote pixel values of the first partial image acquired by a given imaging sensor 106 and $E_{VS}^2$ denote pixel values of the second partial image acquired by the same imaging sensor 106. Pixel value $E_{VS}^1(x_S, y_S)$ of pixel $(x_S, y_S)$ of the first partial image corresponds to pixel value $E_{VS}^2(x_S-dx, y_S-dy)$ of pixel $(x_S-dx, y_S-dy)$ of the second partial image, where dx and dy are the relative displacements along the X-axis and the Y-axis, respectively. Ideally, in case of no vignetting effect, the values of corresponding pixels would have been the same. Therefore, differences between values of corresponding pixels may be attributed to vignetting, and an initial inverse vignetting function $v_s^{in}$ for a given imaging sensor 106 may be calculated based on these differences.

Thus, coefficients $c_{mn}^{in}$ of an initial inverse vignetting function may be calculated using the following set of linear equations:

$$E_{vs}^1(x_s, y_s) \cdot \sum_{n,m=0}^{p} c_{mn}^{in} \cdot x_s^n \cdot y_s^m - E_{vs}^2(x_s - dx, y_s - dy). \qquad \text{(Equation 7)}$$

$$\sum_{n,m=0}^{p} c_{mn}^{in} \cdot (x_s - dx)^n \cdot (y_s - dy)^m = 0,$$

This set of linear equations may be solved and a set of coefficients $c_{mn}^{in}$ for a given imaging sensor 106 may be found.

While an initial inverse vignetting function, calculated based on equation 7, may cure the vignetting effect within a given imaging sensor 106, equation 7 disregards gain G of by optical module 103 as seen by imaging sensor 106. As mentioned before, gain G may substantially differ among optical modules 103. Such differences in gain G may result in intensity differences between partial images corrected using the initial inverse vignetting function, calculated based on equation 7.

According to embodiments of the present invention, a value of gain G may be calculated for a given imaging sensor 106 such that values of pixels captured by this imaging sensor as well as by at least one other imaging sensor, are equalized. For example, a value of gain G may be determined, e.g., arbitrarily, or by a predetermined procedure, for a first given optical sensor 106. The gain G of other imaging sensors that capture scintillator areas overlapping with the first optical sensor 106 may be determined such that values of pixels of these optical sensors found in overlapping areas are equal to corresponding pixel values the first optical sensor 106, and so on.

Coefficients $c_{mn}^{in}$ of a given optical sensor 106 may be adjusted by multiplication by gain G of that optical sensor to obtain coefficients $c_{mn}^{final}$ of a final inverse vignetting function $v_s^{final}$:

$$c_{mn}^{final} = c_{mn}^{in} \cdot G, \qquad \text{(Equation 8)}$$

As demonstrated in Equation 3, the original pixel values $E_{vs}(x_S, y_S)$, prior to the correction of vignetting, are the sum of an element related to the light energy quantity $b \cdot L_{vs}(x_s, y_s)$, and random camera noise $n(x_S, y_S)$. While the element related to the light energy quantity is affected by vignetting, random camera noise $n(x_S, y_S)$ is not. Therefore, vignetting correction using final inverse vignetting function $v_s^{final}$, may lead to a non-uniformity in the contribution of random camera noise $n_v(x_s, y_s)$ to pixel values. While random camera noise $n(x_S, y_S)$ is substantially uniform across imaging sensor 106, the contribution of random camera noise $n_v(x_s, y_s)$ after vignetting correction may not be uniform. The contribution of random camera noise $n_v(x_s, y_s)$ after vignetting correction may equal random camera noise $n(x_S, y_S)$ multiplied by the final inverse vignetting function:

$$n_v(x_s, y_s) = n(x_s, y_s) \cdot v_s^{final}(x_s, y_s), \qquad \text{(Equation 9)}$$

According to embodiments of the present invention, noise uniformity may be retained by the following procedure. An additional noise of the same type as $n(x_S, y_S)$ may be simulated $n_{sim}(x_s, y_s)$ or otherwise derived for a given imaging sensor 106. For example, parameters of the noise of imaging sensor 106 may be measured. Techniques for measuring of noise parameters of imaging sensors are known in the art. These measurements may be performed offline, prior to vignetting correction according to embodiments of the present invention, and the results may be stored in the processing unit.

During routine operation of detector 100, X-Ray images may be acquired 240. The partial output image of each imaging sensor 106 may be adjusted 250 using the final inverse vignetting function $v_s^{final}$. The non-uniformity of the noise contribution may be compensated for using the simulated noise calculated for that imaging sensor 106. Hence the pixel value may be calculated according to:

$$E_s(x_s,y_s) = v_s^{final}(x_s,y_s) \cdot E_{vs}(x_s,y_s) + (1 - v_s(x_s,y_s)) \cdot n_{sim}(x_s,y_s), \qquad \text{(Equation 9)}$$

Using Equation 9, the corrected noise contribution $n_{corr}(x_s, y_s)$ becomes substantially uniform:

$$n_{corr}(x_s,y_s) = v_s^{final}(x_s,y_s) \cdot n(x_s,y_s) + (1 - v_s^{final}(x_s,y_s)) \cdot n_{sim}(x_s,y_s), \qquad \text{(Equation 10)}$$

The plurality of partial images may be stitched to form the complete X-Ray image and the complete X-Ray image may be presented to a viewer.

Figure 3:
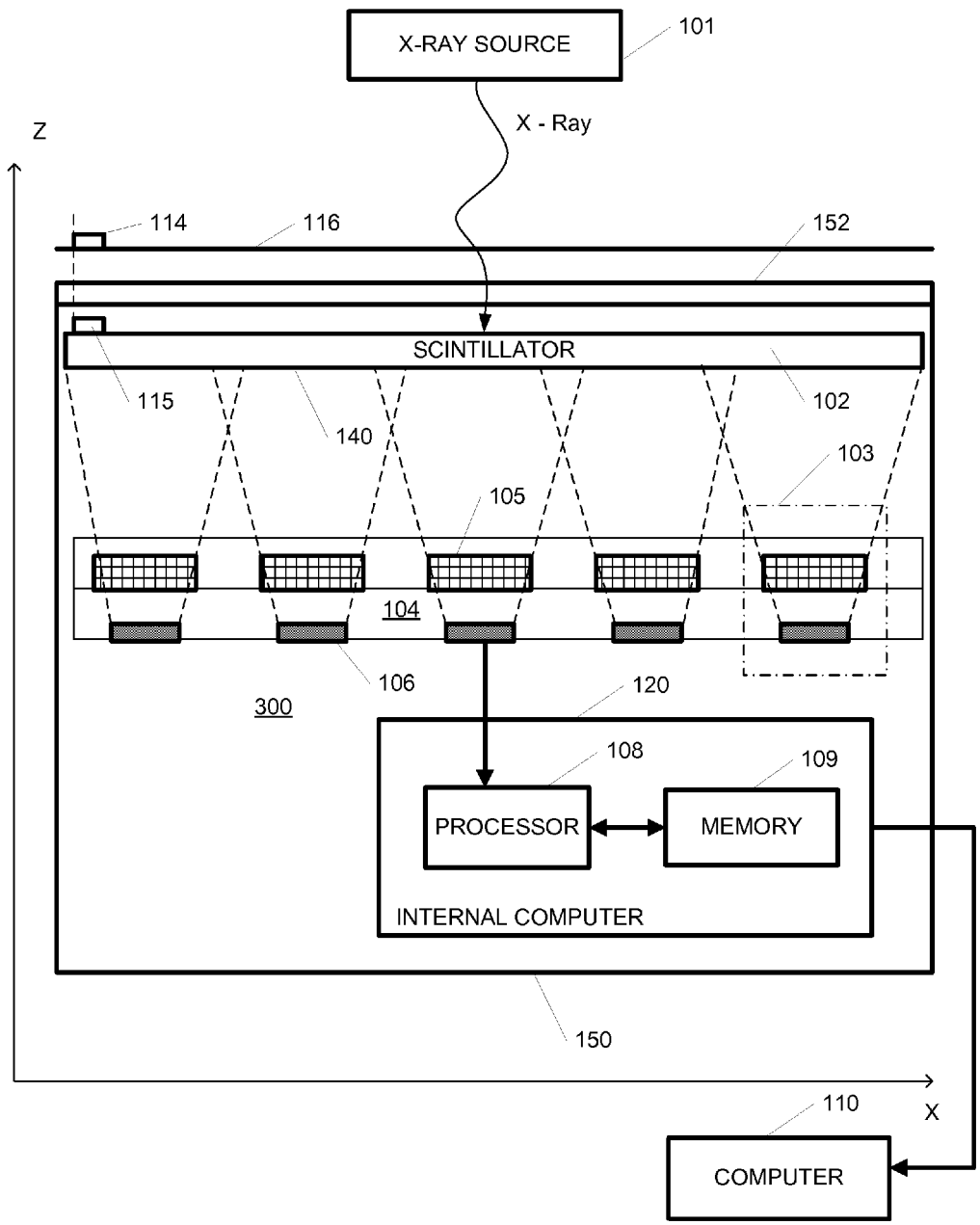
FIG. 3 is a high-level illustration of an exemplary multi-camera flat panel X-Ray detector including markers according to embodiments of the present invention.

Reference is made to FIG. 3 depicting a high-level illustration of an exemplary multi-camera flat panel X-Ray detector 300 according to some embodiments of the present invention. Detector 300 may be similar to detector 100 and may include an exemplary embodiment of relative displacement measurement unit 135. It should be noted that embodiments of the present invention are not limited to the specific implementation shown and that relative displacement between detector 100 and X-Ray source 101 may be measured by any suitable technique having the required accuracy.

According to embodiments of the present invention, detector 100 or X-Ray source 101 may be moved from a first known location on the X-Y plane to a second known location on the X-Y, using techniques known in the art, such that the relative displacement between detector 100 and X-Ray source 101 may be known to the processing unit.

However, according to embodiments of the present invention, a more accurate measurement of the relative displacement may be achieved if the relative displacement is measured optically. For example, at least one marker 114, visible on the partial X-Ray images captured by detector 100, may be placed, for example, on an X-Ray transparent or translucent support system 116. When a relative displacement is generated between detector 100 and X-Ray source 101, marker 114 should remain in a constant location relatively to X-Ray source 101. A first set of partial images may be captured before a relative displacement is generated. Marker 114 may be located on the first set of partial images and the coordinates of marker 114 may be found using image processing techniques. A second set of partial images may be captured after a relative displacement is generated. Marker 114 may be located on the second set of partial images and the coordinates of marker 114 on the second set of partial images may be found. The relative displacement between the detector 100 and X-Ray source 101 may be calculated based on the differences between the coordinates of marker 114 on the two sets of partial images.

Figure 4:
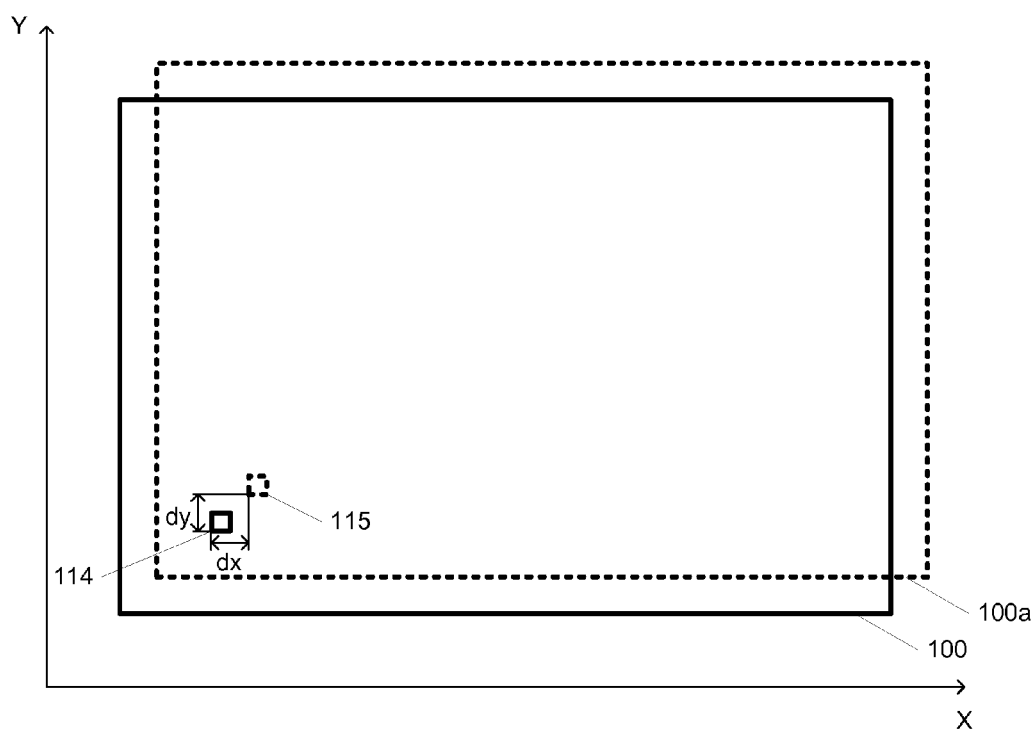
FIG. 4 is a high-level top view illustration of the exemplary multi-camera flat panel X-Ray detector of FIG. 3 according to embodiments of the present invention.

Alternatively, a second marker 115, visible on the X-Ray images captured by detector 100, may be used in addition to marker 114. Markers 114 and 115 may be aligned along the Z-axis before relative displacement is generated between detector 100 and X-Ray source 101. Referring now to FIG. 4, when a relative displacement is generated between detector 100 and X-Ray source 101, marker 115 should remain in a constant location relatively to detector 100. Hence, both marker 114 and marker 115 may be visible on an X-Ray image captured after a relative displacement is generated. The relative displacement between the detector 100 and X-Ray source 101 may be calculated based on the coordinates of markers 114 and 115 on the set of partial images captured after a relative displacement is generated.

Some embodiments of the present invention may be implemented in software for execution by a processor-based system, for example, the approximations of initial and final inverse vignetting functions $v_s^{in}$ and $v_s^{final}$. For example, embodiments of the present invention may be implemented in code and may be stored on a non-transitory storage medium, such as memory unit 109, having stored thereon instructions which can be used to program a system to perform the instructions. The non-transitory storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for correcting vignetting distortion in an optical module comprising imaging sensor and at least one lens, of a multi-camera flat panel X-Ray detector, the method comprising:

taking a first partial X-Ray image by the imaging sensor;
creating relative displacement between the X-Ray detector and an X-Ray source at a plane parallel to a plane of a scintillator of the detector;
taking a second partial X-Ray image by the imaging sensor;
obtaining the relative displacement between the first partial X-Ray image and the second partial X-Ray image; and
calculating coefficients of a preliminary inverse vignetting function based on differences between corresponding pixels of the two partial images.

2. The method of claim 1, comprising:
calculating a gain for the optical module by equalizing values of pixels captured by the imaging sensor as well as by at least one other imaging sensor of the multi-camera flat panel X-Ray detector; and
adjusting the coefficients of the preliminary inverse vignetting function by the gain to obtain coefficients of a final inverse vignetting function.

3. The method of claim 2, comprising:
during routine operation of the detector:
acquiring routine partial X-Ray images; and
adjusting the routine partial X-Ray images, using the final inverse vignetting function to obtain adjusted partial X-Ray images.

4. The method of claim 3, comprising:
compensating for non-uniformity of noise contribution in the adjusted partial X-Ray images using simulated noise calculated based on measured noise parameters of the imaging sensor.

5. The method of claim 1, wherein the initial and final inverse vignetting functions are polynomial functions.

6. The method of claim 1, wherein the relative displacement between the first partial X-Ray image and the second partial X-Ray image is obtained based on the differences between coordinates of a marker visible on the first partial X-Ray image and the second partial X-Ray image, wherein the marker remains in a constant location relatively to X-Ray source when the relative displacement is generated.

7. The method of claim 1, wherein the relative displacement between the first partial X-Ray image and the second partial X-Ray image is obtained based on the differences between coordinates of a first marker and a second marker visible on the second partial X-Ray image, wherein the first marker and the second marker are aligned with respect to an axis perpendicular to the scintillator of the detector before the relative displacement is generated, and wherein the first marker remains in a constant location relatively to X-Ray source, and the second marker remains in a constant location relatively to the detector, when the relative displacement is generated.

8. A multi-camera flat panel X-Ray detector, the detector comprising:
a scintillator to convert X-Ray radiation generated by an X-Ray source into detectable radiation;
a displacement unit to generate, during a calibration phase, relative displacement between the X-Ray detector and an X-Ray source at a plane parallel to the scintillator;
at least one optical module, wherein the optical module comprises an imaging sensor and at least one lens, the imaging sensor to acquire, during the calibration phase, a first and a second partial images related to the detectable radiation, at a field of view of the at least one imaging sensor, wherein the first partial image is to be acquired before the relative displacement is generated, and the second partial image is to be acquired after the relative displacement is generated;

a relative displacement measurement unit to measure the relative displacement; and a processing unit to:
obtain the relative displacement, the first and the second partial images; and to
calculate coefficients of a preliminary inverse vignetting function based on differences between corresponding pixels of the two partial images.

9. The detector of claim 8, wherein the processing unit is further to:
calculate a gain for the optical module by equalizing values of pixels captured by the imaging sensor as well as by at least one other imaging sensor of the multi-camera flat panel X-Ray detector; and
adjusting the coefficients of the preliminary inverse vignetting function by the gain to obtain coefficients of a final inverse vignetting function.

10. The detector of claim 9, wherein during routine operation of the detector
the at least one imaging sensor is further to acquire routine partial X-Ray images; and
the processing unit is further to adjust the routine partial X-Ray images, using the final inverse vignetting function to obtain adjusted partial X-Ray images.

11. The detector of claim 10, wherein during routine operation of the detector the processing unit is further to compensate for non-uniformity of noise contribution in the adjusted partial X-Ray images using simulated noise calculated based on measured noise parameters of the imaging sensor.

12. The detector of claim 8, wherein the initial and final inverse vignetting functions are polynomial functions.

13. The detector of claim 8,
wherein the relative displacement measurement unit comprises a marker visible on the first partial X-Ray image and the second partial X-Ray image,
wherein the marker remains in a constant location relatively to X-Ray source when the relative displacement is generated, and
wherein relative displacement between the first partial X-Ray image and the second partial X-Ray image is measured based on the differences between coordinates of the marker on the first partial X-Ray image and the second partial X-Ray image.

14. The detector of claim 8,
wherein the relative displacement measurement unit comprises a first marker and a second marker visible on the second partial X-Ray image,
wherein the first marker and the second marker are aligned with respect to an axis perpendicular to the scintillator before the relative displacement is generated, and
wherein the first marker remains in a constant location relatively to X-Ray source, and the second marker remains in a constant location relatively to the detector, when the relative displacement is generated, and wherein the relative displacement between the first partial X-Ray image and the second partial X-Ray image is obtained based on the differences between coordinates of the first marker and the second marker on the second partial X-Ray image.

* * * * *